June 12, 1951 E. E. CLINE ET AL 2,556,904
VALVE
Filed Oct. 10, 1945 3 Sheets-Sheet 1
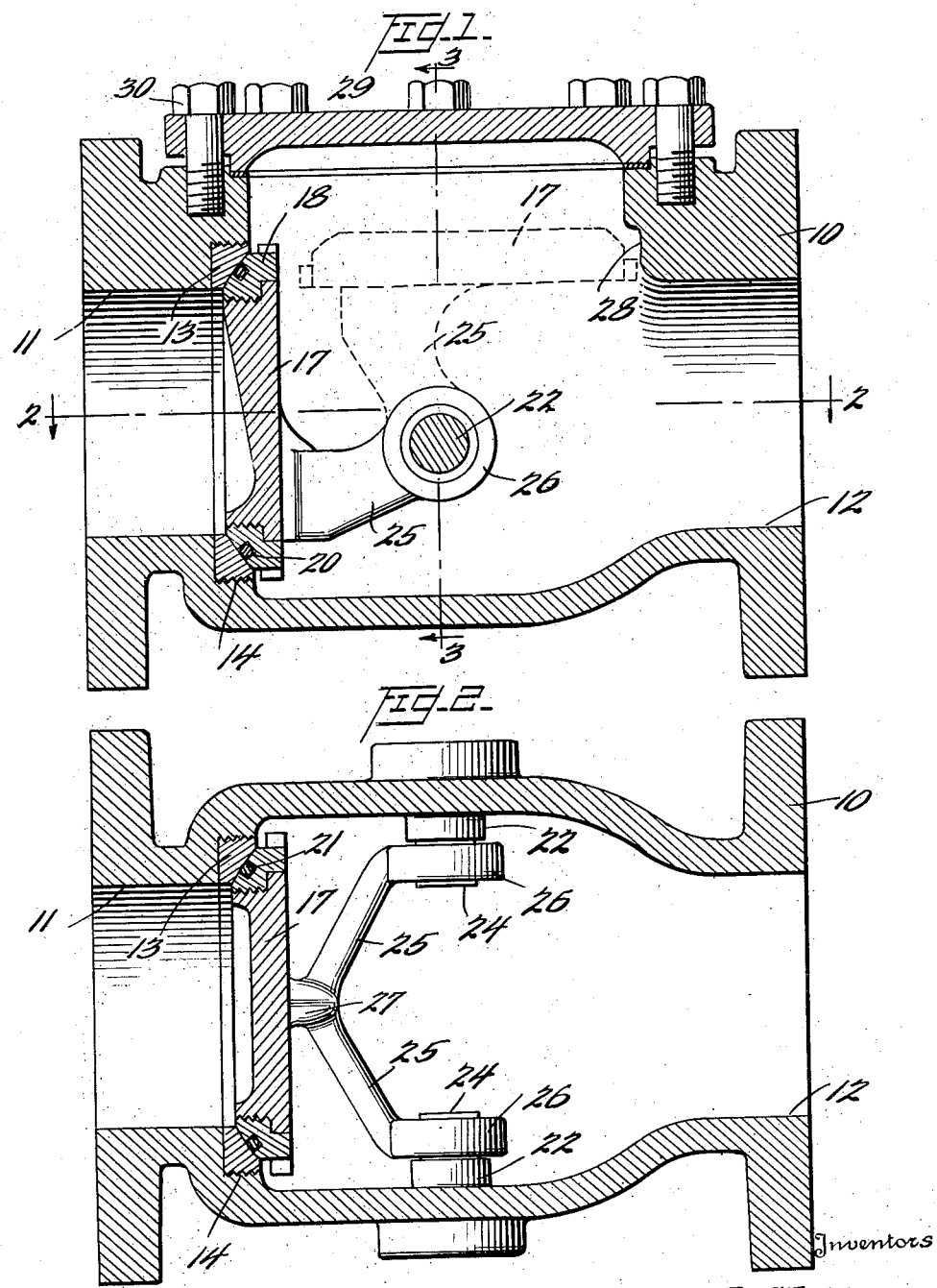
Inventors
Earl E. Cline
Frederick Tratzik
By Cushman, Darby, Cushman
Attorneys June 12, 1951 E. E. CLINE ET AL 2,556,904
VALVE
Filed Oct. 10, 1945 3 Sheets-Sheet 2
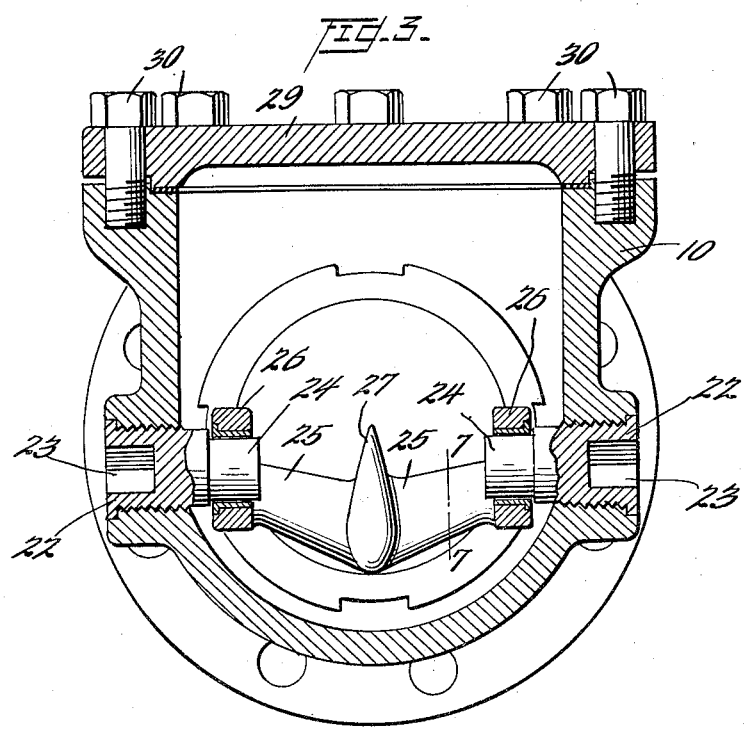
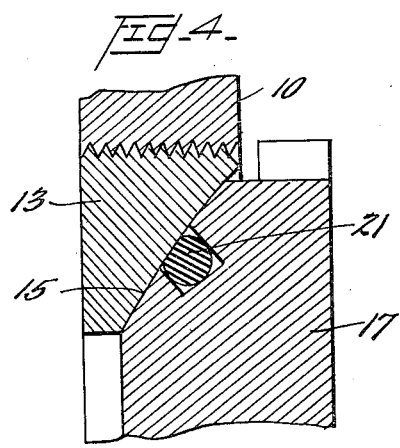
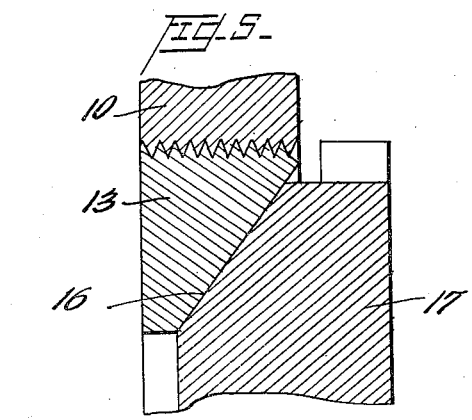
Inventors
Earl E. Cline
Frederick Tratzik
By Cushman, Darby & Cushman
Attorneys June 12, 1951  E. E. CLINE ET AL  2,556,904
VALVE
Filed Oct. 10, 1945  3 Sheets-Sheet 3
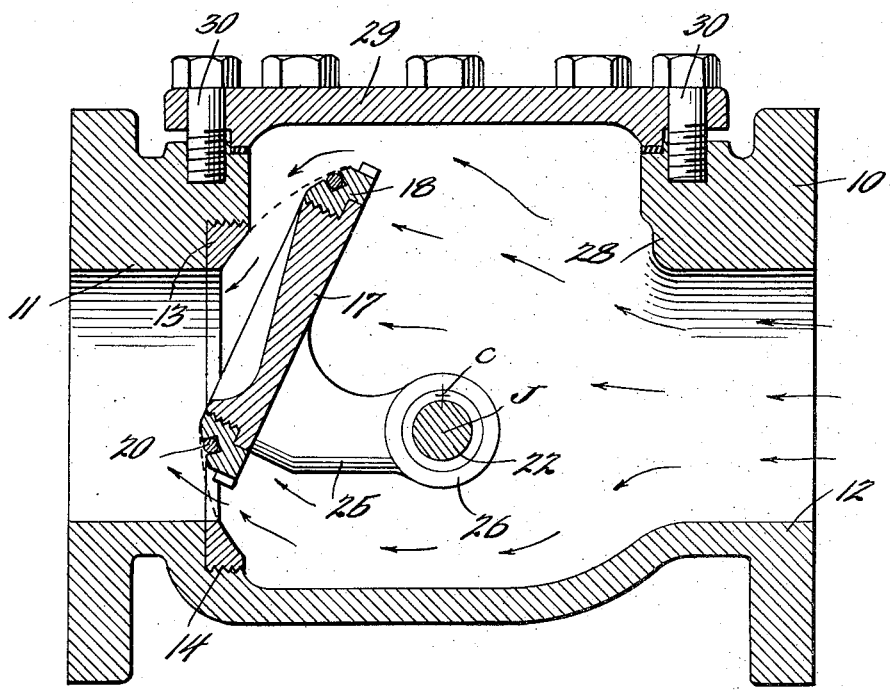
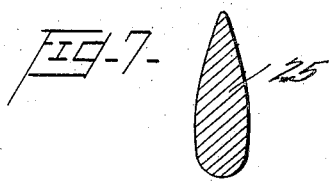

Patented June 12, 1951

2,556,904

UNITED STATES PATENT OFFICE 2,556,904

VALVE

Earl E. Cline and Frederick Tratzik, Decatur, Ill., assignors to Mueller Co., Decatur, Ill., a corporation of Illinois Application October 10, 1945, Serial No. 621,482

1 Claim. (Cl. 251—123)

This invention has to do with valves. It relates particularly to that type of check valve frequently characterized as "slam valves," for the reason that this type of valve is generally closed solely by the flow of current, usually a reverse flow, in the conduit or fluidway in which they are placed. They are adapted for various uses and are especially useful where, upon the setting up of a reverse flow in a fluidway, it becomes desirable to promptly and effectively seal the conduit against such reverse flow. In many cases the valve movement in closing is so rapid and violent as to cause undersirable slamming, with possible injury to the valve or its seat.

The valve structure herein disclosed has advantages over known valves, some of which advantages may be briefly stated.

It can be set into any conduit, regardless of the positioning of the conduit, whether vertically, horizontally, or angularly, and function with equal facility. It is adaptable to all diameters of fluidways to control large or small passages, and high or low pressures.

It is so developed as to to its valve seat and valve, with the valve so mounted as to respond to flow in opposite directions to effect opening and closing of the valve.

The valve and valve seat may have straight contact faces as distinguished from the curved face Corliss type of valve and seat, which contact faces may be brought into sealing contact by reason of the pivotal mounting of the valve which effects its seating on the valve seat, the valve engaging and moving away from the seat with a sliding action but without undue friction, such seating action eliminating all danger of slamming.

The construction and assemblage is such that ample clearance for the valve relative to the seat and housing, both in moving to and from its seat, is provided, without in any way affecting the proper seating of the valve in completely closed position.

The parts and the make-up of the valve are so designed that in the open position of the valve the way is not materially obstructed, and by using appropriately streamlined valve parts which are subject to flow pressure, action of the valve in opening and closing is rendered smooth and even.

These desirable results and other advantages will more clearly appear from the detailed description which follows, which description, taken in connection with the drawings which accompany and form part of this specification, disclose one physical embodiment of the invention.

In the drawings—

Figure 1 is a view in vertical longitudinal section of a valve and valve casing embodying my invention.

Figure 2 is a view in horizontal longitudinal section on substantially the line 2—2 of Figure 1, looking in the direction of the arrow.

Figure 3 is a transverse sectional view substantially on the line 3—3 of Figure 1, with the valve in closed position.

Figure 4 is a fragmentary sectional view showing a portion of the valve seat and valve.

Figure 5 is a view similar to Figure 4, showing a slightly modified form of seat and valve.

Figure 6 is a view in vertical longitudinal section, similar to Figure 1, showing the valve approaching the valve seat.

Figure 7 is a cross sectional view of a valve supporting arm on substantially the line 7—7 of Figure 3.

Referring to the drawings by numbers, the same numbers indicating the same parts in the several views, the casing 10, which may be set into any suitable conduit at the desired point, is provided, said casing having an inlet 11 and an outlet 12; flow through casing 10 being normally from the inlet 11 to the outlet 12.

At the inlet side 11 the casing has a valve seat, here shown as formed of a ring 13 of any suitable material, threaded or otherwise suitably secured in seat-receiving recess 14 formed in the casing body. Preferably the recess 14 will have its seat-receiving wall formed at right angles to the longitudinal axis of the casing so that it will be conveniently accessible for machining, assembling of parts, or other operations. The ring 13 has a seating face 15 which may be spherical, as shown in Fig. 4, or the face may be flat, as shown at 16 in Fig. 5, but in any case is inclined with respect to the axis thereof.

The valve is made up of the valve body 17 and the seating ring 18 secured to a body in any suitable manner, as by the threaded connection shown, this ring co-operating with the valve seat 13. Its seating surface may be spherical to correspond with a spherical surface 15 of the valve seat, as shown in Fig. 4, or flat to correspond with the valve seat 16, as shown in Fig. 5. These surfaces may be varied, if desired, and a spherical surface on the valve or on the valve seat may be used to cooperate with an opposed angular surface on the other of the two members.

The seating ring 18 of the valve, as shown in Figures 1, 2, and 4, may be recessed at 20 and provided with a sealing ring 21 fitted in the recess and normally protruding therefrom so as to additionally seal the valve to its seat when closing pressure is exerted on the valve.

The valve will be pivotally mounted on pins 22 threaded (or otherwise suitably secured), in side walls 10 of the casing, the pins 22 as here shown being provided with tool-receiving apertures 23 for insertion and removal of the pins. At their inner ends the pins 22 are provided with trunnions 24 with which the arms 25 of the valve are engaged. It will be seen that the arms 25 are spread and provided with bearing lugs 26 to engage the trunnions 24 on the pins 22, the arms 25 being joined to the valve 17 by the portion 27 of the arm structure.

The pins 22 and trunnions 24, as will be seen from Figs. 1 and 2, are disposed substantially in the vertical center of the chamber of casing 10 and below the longitudinal axis of the casing. This disposition of the pivotal center of the valve and the streamlined valve carrying arms 25 which are joined to the valve 17 near its rim, insure movement of the valve to and from its active and inactive positions in a proper arc for port closing in active position and positioning out of the fluidway in inactive position. The pivots of valve 17 are so placed that the valve moves to its valve-seat engaging and inlet-port closing positions and seats with a sliding action in the valve seat in complete sealing relation to said seat. This action takes place whether the contact faces of seat and valve are spherical, angular, or opposed spherical and angular faces. Further, the seating action is not modified by the use of the O ring in one or the other of the faces of seat or valve since that ring merely supplements the sealing action of the valve.

The trunnions 24 and bearing lugs 26 fit loosely and have a slight play to permit movement of the valve 17 to and from its seat and insure proper seating of the valve. The center of the sphere which represents the concave seating surface of the valve seat and the convex surface of the valve is at the point C, Fig. 6. The center of the journals of the valve member is at J, which causes the path of travel of the forward edges of the valve to be along the dotted lines shown in Fig. 6. With this assembly and path of travel the valve edges move in lines, as indicated in the drawings, Fig. 6, which clear the seating surfaces until the valve comes to its completely closed position as shown in Fig. 2.

With this construction when the valve 17 is moved to its open dotted line position in the offset recess provided for its reception, as shown in Fig. 1, the fluidway through the conduit is practically unobstructed. As shown in Fig. 1, the valve 17 lies above the fluidway and is housed within the offset recess 28 in the valve casing 10, a cover 29 being secured to the casing in any suitable manner, as by the threaded bolts 30, so as to permit ready removal and give convenient access to the interior of the casing. The widespread arms 25, when the valve is opened; the bearings 26, and the trunnions 24 present but little obstruction to current flow in the fluidway. In order to lessen interference with that flow by the arms 25 they are preferably made, as shown in Fig. 7, streamlined, and this is true of the member 27 where the arms 25, join, so that interruption of flow is reduced to a minimum.

Normally, with the flow coming through the inlet 11 in the direction of the arrow, the valve will be lifted to the dotted line position shown in Fig. 1. That position will persist until inlet flow lessens and reverse flow is set up, whereupon reverse flow acting against the upper and lower portions of the valve 17 will ease the valve to its seat, the opposing action of the reverse flow above and below the valve center preventing any abrupt closing or slamming of the valve, and the valve will close with the sliding action of the valve ring 18 against the face of the valve seat ring 13 as described. The construction and assembly of the parts is such that the valve, turning on its trunnions moves, as stated, toward and from its seat with a sliding action, the pivotal positioning being such that there will be clearance of the valve in moving to and returning from its active to its inactive position. The closing of the valve 17 will, under the influence of reverse flow, as pointed out, be retarded, as the changing position of the valve 17 in moving from its inactive dotted line position shown in Fig. 1 to its full line position are such that there will be a retardation in its movement owing to the opposing flow of the reverse current on the upper and lower portions of the valve.

This disclosure, it is to be understood, is illustrative and not limiting, the invention as defined in the claim extending to any obvious mechanical variations.

We claim:

A valve of the character described, comprising a casing having a fluidway therethrough, an annular valve seat adjacent one end of said fluidway, the seating surface of said seat being inclined with respect to the axis thereof, a fluid operable valve engageable with said seat, said casing having a recess above and communicating with the fluidway for housing said valve, said valve having diverging streamline-shaped arms extending rearwardly therefrom, transversely opposed trunnions in the side walls of the casing, said arms being pivotally and loosely connected to said trunnions, the axis of said trunnions being offset and below the axis of said valve seat so that said valve is pivotally movable about said trunnions and is slidable transversely relative to the valve seat by the flow of the fluid into the fluidway against the front face of the valve when the latter is closed in order to raise and move the valve into said recess so as not to interfere with the free flow of the fluid through the casing, and said valve when the flow is in an opposite direction through the fluidway being moved and maintained in its closed position against said seat by the pressure of the fluid.

EARL E. CLINE.
FREDERICK TRATZIK.

REFERENCES CITED

The following references are of record in the file of this patent:

UNITED STATES PATENTS

| Number | Name | Date |
|---|---|---|
| 377,963 | Smith | Feb. 14, 1888 |
| 1,095,105 | Goodwin | Apr. 28, 1914 |
| 1,239,015 | Key | Sept. 4, 1917 |
| 1,444,767 | McGee | Feb. 6, 1923 |
| 1,656,183 | Enz | Jan. 17, 1928 |
| 1,744,798 | Price | Jan. 28, 1930 |
| 1,911,107 | Carter | May 23, 1933 |
| 1,982,189 | Anderson | Nov. 27, 1934 |
| 1,987,974 | Richardson | Jan. 15, 1935 |
| 2,048,943 | Munn | July 28, 1936 |
| 2,247,773 | Dunn | July 1, 1941 |
| 2,262,726 | Nickerson | Nov. 11, 1941 |
| 2,356,815 | Bishoff | Aug. 29, 1944 |

FOREIGN PATENTS

| Number | Country | Date |
|---|---|---|
| 669,260 | France | of 1929 |